INVENTORS.
ROBERT J. KASPER &
STANLEY J. RYBA, JR
BY Meyer, Tilberry & Body
ATTORNEYS

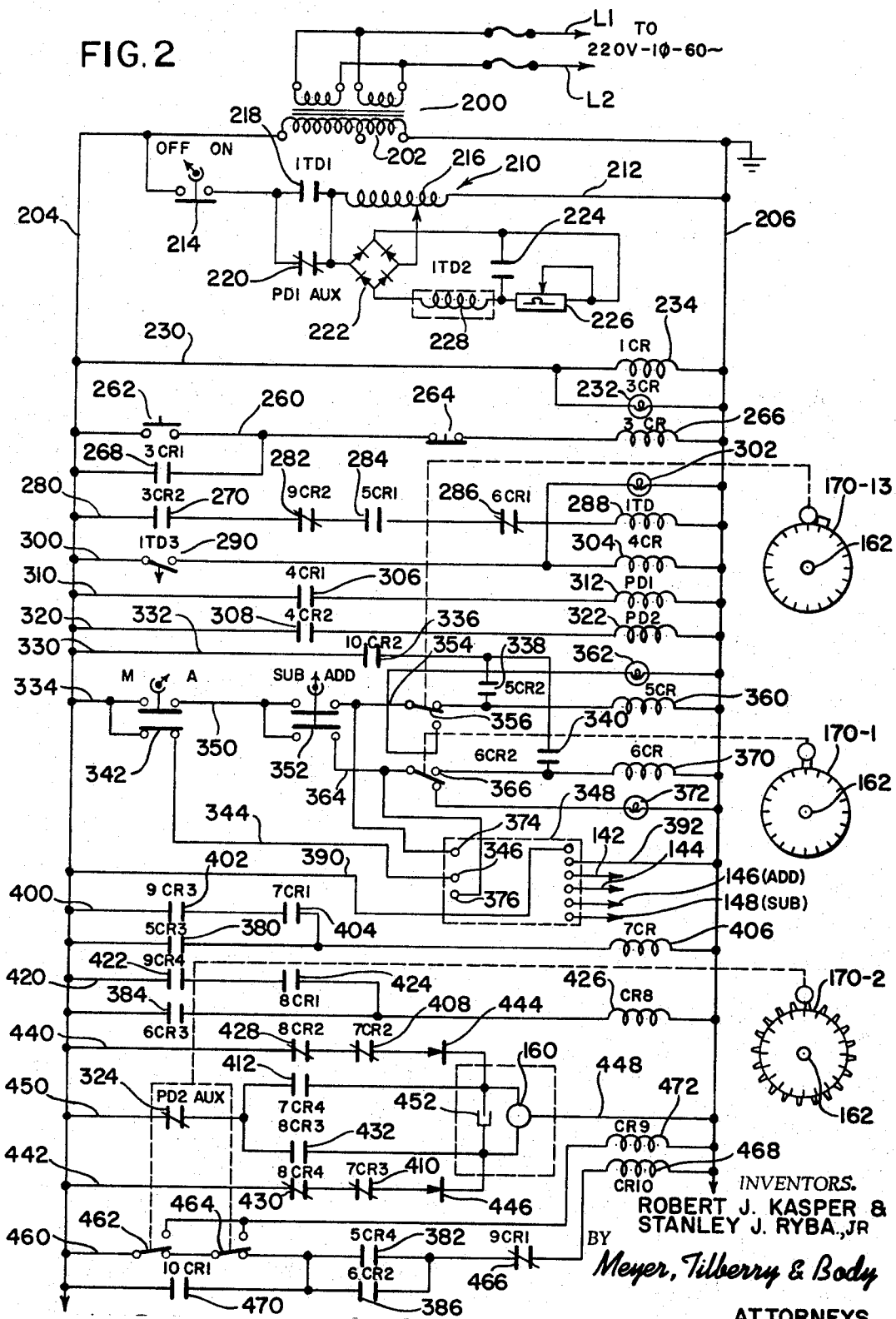

Dec. 31, 1968 R. J. KASPER ETAL 3,419,792
DEVICE FOR CONTROLLING THE POWER FACTOR IN THE
OUTPUT CIRCUIT OF A GENERATOR
Filed Feb. 1, 1966 Sheet 3 of 4

INVENTORS.
ROBERT J. KASPER &
STANLEY J. RYBA, JR
BY
Meyer, Tilberry & Body
ATTORNEYS INVENTORS.
ROBERT J. KASPER &
STANLEY J. RYBA, JR
BY Meyer, Tilberry & Body
ATTORNEYS United States Patent Office 3,419,792
Patented Dec. 31, 1968

3,419,792
DEVICE FOR CONTROLLING THE POWER FACTOR IN THE OUTPUT CIRCUIT OF A GENERATOR
Robert J. Kasper, Seven Hills, and Stanley J. Ryba, Jr., Cleveland, Ohio, assignors to The Ohio Crankshaft Company, Cleveland, Ohio, a corporation of Ohio
Filed Feb. 1, 1966, Ser. No. 524,007
22 Claims. (Cl. 323—105)

ABSTRACT OF THE DISCLOSURE

There is provided a device for maintaining within a preselected range the power factor in a load connected output circuit of a generator while the electrical characteristics of the load vary. A bank of separate capacitor branches are provided with a capacitor and a switch means, and a reversible motor sequentially, and in stepped fashion, operates each of these switch means to increase the number of branches electrically connected in the output when the motor rotates in a first direction and to decrease the number of branches electrically connected in the output when the motor rotates in the other direction. The direction of rotation of the motor is controlled by the deviation direction of the power factor of the load circuit from a preselected range.

---

This invention pertains to the art of controlling a generator and more particularly to a device for controlling the power factor in the output circuit of a generator.

The invention is particularly applicable for use in controlling the power factor in the output circuit of a high frequency generator of the type used in an induction melting furnace, and it will be described with particular reference thereto; however, it will be appreciated that the invention has much broader applications and may be used for controlling the power factor in the output circuit of various other generators and analogous equipment.

An induction melting furnace generally includes a holding pot for supporting metal to be melted, a coil surrounding the pot, and a generator having an output circuit connected across the coil. In operation, the generator creates current flow through the coil which, in turn, causes alternating magnetic fields to pass through the metal within the pot. These fields induce current flow in the metal so that the metal is heated, primarily by the $I^2R$ heating principle. To obtain maximum efficiency during the heating operation, the power factor in the generator output circuit, i.e. the cosine of the angle between the voltage and current, must be maintained at unity. Since the load is predominantly inductive, a unity power factor can be obtained by placing balancing capacitors within the output circuit of the generator. These power factor correcting or balancing capacitors are commonly used in the induction heating installation; however, a melting furnace poses somewhat unique problems. As the metal heats and flows in the pot, the permeability of the metal changes, if it is ferromagnetic, and the coupling between the metal and the alternating fields changes. These physical changes in the metal cause corresponding changes in the impedance of the generator output circuit. Consequently, during operation of the melting furnace, the added capacitance in the output circuit must be periodically changed to maintain a unity power factor.

A variety of electrical and mechanical mechanisms have been developed for automatically adjusting the power factor correcting capacitors in response to changes in the electrical parameters of the generator output circuit; however, these prior mechanism have generally included primarily mechanical elements or sliding contacts for changing the power factor correcting capacitors. These systems were, therefore, somewhat susceptible to failure because of dust particles within the surrounding atmosphere and because of wear both to the mechanical elements and the sliding contacts.

These and other disadvantages of prior mechanisms for automatically controlling the power factor in the output circuit of a generator have been overcome by the present invention which is directed toward a device for maintaining the proper power factor in the output circuit of a generator with a minimum of mechanical elements.

In accordance with the present invention, there is provided a device for maintaining within a preselected range the power factor in the load connected output circuit of a generator while the electrical characteristics of the load vary. This device comprises a bank of separate capacitor branches each including a capacitor and a switch means for selectively connecting the capacitor into the output circuit, a reversible motor means, means responsive to rotation of the motor means for sequentially and in stepped fashion operating each of the switch means to increase the number of branches electrically connected in the output circuit when the motor means rotates in a first direction and to decrease the number of branches electrically connected in the output circuit when the motor rotates in a second direction, power factor meter means in the output circuit to sense a deviation of the power factor in the output circuit from the preselected range, means for rotating the motor means in response to the sensed deviation of the actual power factor to correct the power factor with the motor rotating in the first direction when the sensed deviation is on one side of the preselected range and in the second direction when the sensed deviation is on the other side of the preselected range, means for braking the motor against rotation, and means for actuating the braking means when the meter means senses a power factor within the preselected range.

In accordance with another aspect of the present invention, there is provided a device as described above. This device comprises a bank of separate capacitor branches each including a capacitor and a switch means for selectively connecting the capacitor into the output circuit, a reversible motor having an output shaft, means driven by the shaft for sequentially and in stepped fashion closing the switch means when the shaft is rotated in a first direction and for sequentially and in stepped fashion opening the switch means when the shaft is rotated in a second direction whereby the motor moves between distinct stepped positions, monitoring means in the output circuit to generate an "add" signal when the power factor of the output circuit deviates in one direction from the range, and monitoring means in the output circuit to generate a "subtract" signal when the power factor of the output circuit deviates in the other direction from the preselected range. There is also included a first relay coil for energizing the motor in the first direction, means for energizing the first coil by the "add" signal, a second relay coil for energizing the motor in the second direction, means for energizing the second coil by the "subtract" signal, means for maintaining the first and second coils in an energized condition until the motor has rotated into a given stepped position, and means for de-energizing the maintaining means at each stepped position whereby the first and second coils are both de-energized by the absence of a signal.

The above defined power factor controlling device for the output circuit of a generator requires a minimum of mechanical equipment and various switches are closed by a rotary motor in stepped sequence so that the output circuit may be maintained at substantially unity power factor during the operation of the generator.

The primary object of the present invention is the provision of a device for maintaining the power factor of the output circuit of a generator within a preselected range, which device is accurate and durable in operation and may be installed into existing equipment.

Another object of the present invention is the provision of a device for maintaining the power factor of the output circuit of a generator within a preselected range, which device includes a stepping mechanism and a circuit for maintaining movement of the stepping mechanism between stepped positions irrespective of the power factor within the output circuit.

Yet another object of the present invention is the provision of a device for maintaining the power factor of the output circuit of the generator within a preselected range, which device includes a motor driven stepping mechanism and a dynamic brake on the motor, with the brake being actuated only when the mechanism is in a stepped position.

Still another object of the present invention is the provision of a device for maintaining the power factor of the output circuit of a generator within a preselected range, which device includes a motor driven bank of cams with the cams operating switches to place the proper amount of power factor correcting capacitance within the output circuit of the generator.

These and other objects and advantages will become apparent from the following description used to illustrate the preferred embodiment of the invention as read in connection with the accompanying drawings in which:

FIGURE 2 is a wiring diagram showing a second portion of the preferred embodiment of the present invention;

Figure 1:
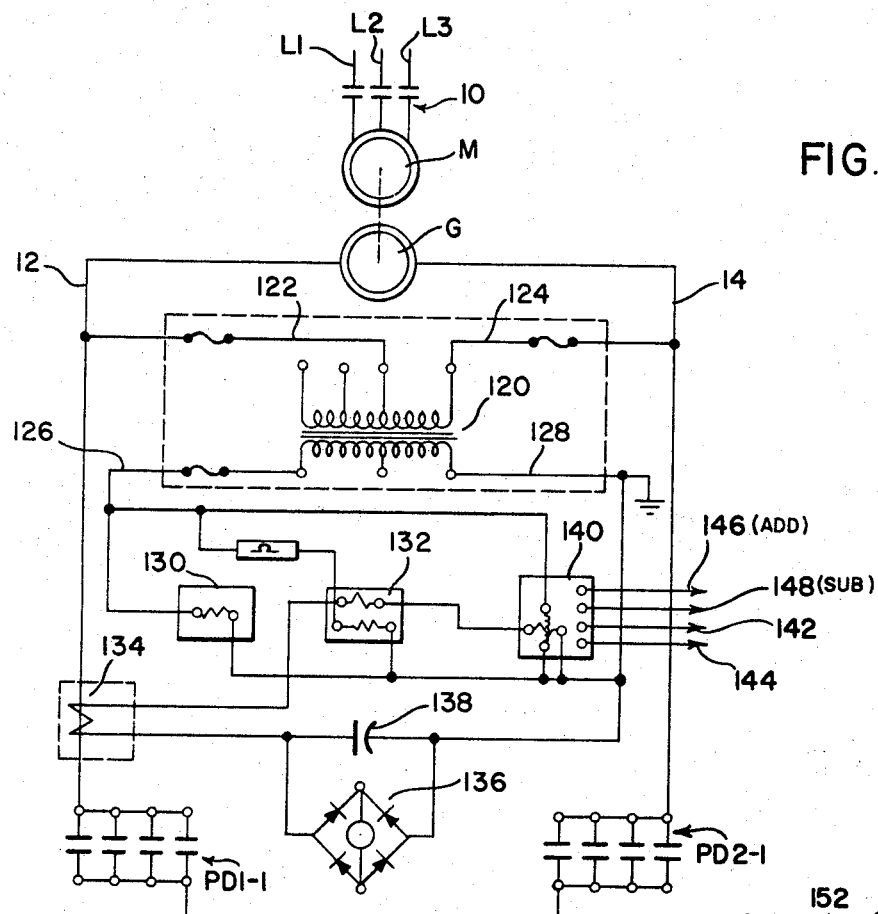
FIGURE 1 is a wiring diagram showing, somewhat schematically, one portion of the present invention.

Referring now to the drawings wherein the showings are for the purpose of illustrating a preferred embodiment of the invention only and not for the purpose of limiting same, the figures show a device for maintaining the power factor in the outlet circuit of a generator having general application. Referring to FIGURE 1, a motor M is connected by circuit breakers 10 with input lines L1, L2 and L3. The motor drives a generator G having output leads 12, 14 and lead disconnect PD1–1 and PD2–1. These disconnects selectively connect the output leads with a load or output circuit 20. This output circuit includes leads 22, 24 coupled to the input of an autotransformer 26. The transformer has appropriate input taps 28 and a movable contact 30 connected onto lead 24. The output side of the transformer 26 is connected across load leads 32, 34 so that electrical energy may be directed to a coil 40. In accordance with normal practices, the coil 40 may be used for a variety of heating operations; however, any of such heating operations generally includes a workpiece 42 and a magnetic field 44 which couples the workpiece magnetically with the coil. It is appreciated that the coil and workpiece are only schematically represented. In accordance with the preferred embodiment of the invention, the workpiece 42 is metal within a holding pot which metal is inductively heated by current flow through the coil 40. As the metal is heated, the electrical characteristics of the metal changes. This changes the electrical characteristics in the output circuit 20, in a manner well known in the art of induction heating.

Since the load within output circuit 20 is predominantly inductive, the power factor within the load circuit is lagging, and it must be corrected by adding capacitors in parallel with the load. To accomplish this function, there is provided a power factor correcting capacitor 50 connected across leads 32, 34. This capacitor forms a minimum capacitance across the load and is maintained in the load circuit at all times. In parallel with the load and with the capacitor 50 are capacitance branches 52, 54, 56, 58, 60, 62, 64, 66, 68 and 70. These branches include capacitors 72, 74, 76, 78, 80, 82, 84, 86, 88 and 90 and switches 92, 94, 96, 98, 100, 102, 104, 106, 108 and 110, respectively. In accordance with the preferred embodiment of the present invention, the capacitance of capacitor 72 is substantially one-half the capacitance of the other capacitors within the parallel branches. The purpose of the lower capacitance of capacitor 72 will be hereinafter described in detail. By closing selective switches 92–110, the capacitance within the load circuit may be controlled to balance the inductance of the load itself. The present invention is directed toward a system for selectively closing the various switches to maintain the power factor of the load or output circuit 20 within a predetermined range.

A transformer 120 includes input leads 122, 124 and output leads 126, 128. The output leads are connected across the metering circuit of generator G. This metering circuit includes a somewhat conventional voltage meter 130 and watt meter 132. A current transformer 134 is connected in series with a full wave rectifier 136 having a filter capacitor 138, and the rectifier and current transformer are used to power the watt meter 132 and a KVAR meter 140. KVAR meter 140 is the meter within the system which is used to control the amount of capacitance within the output circuit of the generator. This meter is provided with input leads 142, 144 for supplying a voltage of approximately 28 volts to the meter so that a signal may be generated and emitted through output leads 146, 148.

Figure 1A:
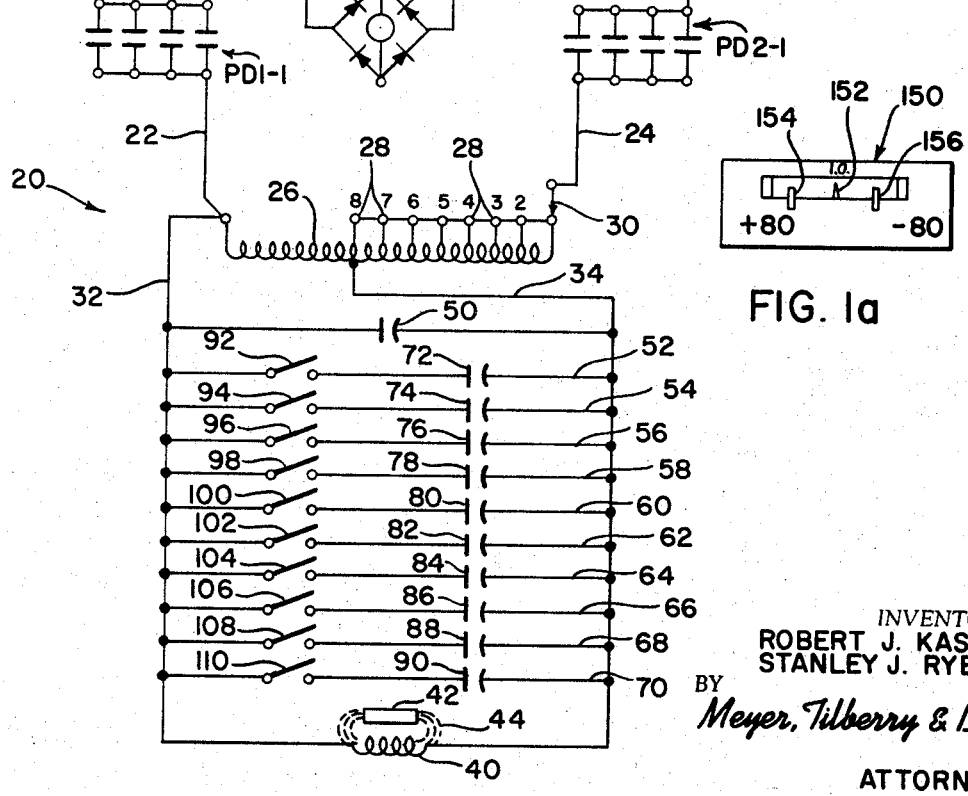
FIGURE 1a is a plan view showing, somewhat schematically, one of the elements illustrated in FIGURE 1.

Referring to FIGURE 1a, meter 140 includes an indicator 150 having a pointer 152 which continuously indicates the actual power factor within the load or output circuit of generator G. Adjustable limit markers 154, 156 are set on opposite sides of a unitary power factor positioned within the indicator so as to define a predetermined range of deviation of the power factor from unity. The maximum range is 20% on either side of unity; however, in practice this range is somewhat less than 20%. The pointer 152 moves toward the limit markers 154, 156 as the power factor deviates from unity. When the power factor deviates in a direction which would require more capacitance within the load circuit, i.e. indicating a lagging power factor exceeding the set range, an "add" signal is created within meter 140 and passed through lead 146. As the power factor deviation swings the other direction and requires a reduction in the amount of capacitance in the load circuit, i.e. indicating a leading power factor exceeding the set range, a "subtract" signal is generated within the meter 140 and passed through lead 148. The "add" and "subtract" signals are utilized in the remainder of the device forming the present invention in a manner to be hereinafter described in detail.

Figure 5:
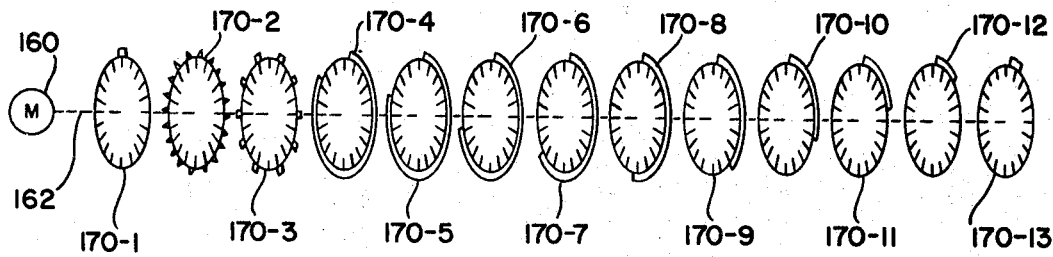

A reversible motor 160, best shown in FIGURE 5, includes an output shaft 162 onto which are mounted a series of cams 170–1 to 170–13. These cams each have different lobes which perform the function of adding and subtracting capacitance from the load circuit in a manner to be described later. The cams 170–1, 170–2, and 170–13 are used in the control circuit as such and are not used directly as means for adding and subtracting capacitance from the load circuit. Cams 170–3 to 170–12 are used to control the capacitance branches 52–70, respectively.

Figure 4:
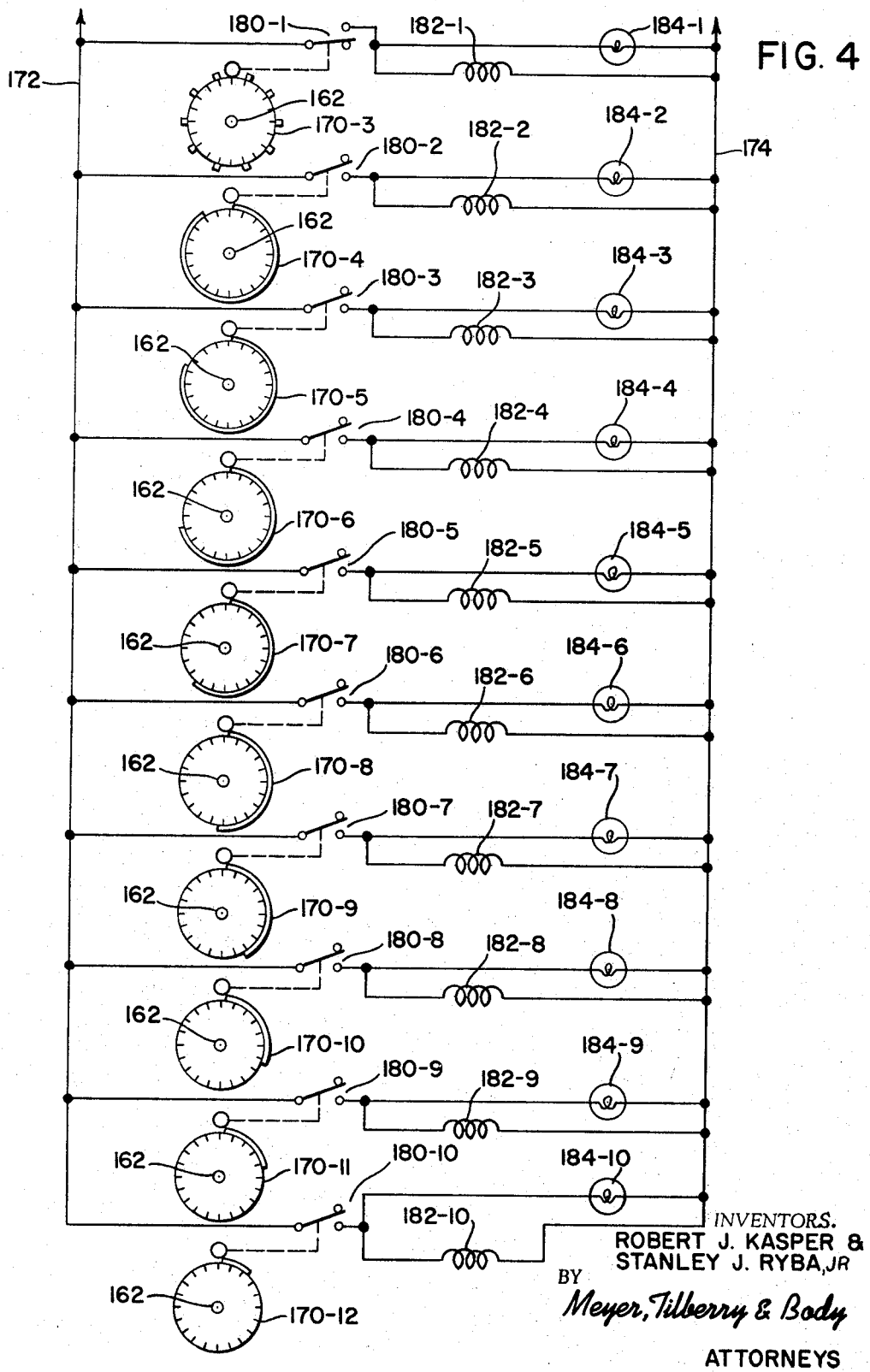
FIGURE 4 is a combined wiring and mechanical diagram illustrating the operation of the preferred embodiment of the present invention; and, FIGURE 5 is an exploded view illustrating the cam bank utilized in the present invention.

As best shown in FIGURE 4, the cams 170–3 to 170–12 are incorporated within an electrical circuit including spaced power lines 172, 174. A plurality of switches 180–1 to 180–10 are controlled by cams 170–3 to 170–12, respectively. When these switches are closed, coils 182–1 to 182–10 are energized. The actuation of these coils in turn closes the switches within the respective capacitance branches 52–70. In other words, when the lobe of cam 170–3 closes switch 180–1, coil 182–1 is energized and switch 92 is closed. This places capacitance 72 in parallel across coil 40. The same general operating procedure takes place with all cams 170–4 to 170–12. The lobes of the cams 170–3 to 170–13 are accurately shown in FIGURE 4 so that when the shaft 162 moves the cams in one direction, the switches 180–1 to 180–10 are closed in sequence. When the cams are rotated in an opposite direction, the switches are opened in sequence. In order to appreciate which cams would be closed in each stepped position, the cams are illustrated with numbered stepped position. For instance, when shaft 162 moves the cams in unison to position 11, the switches associated with cams 170–4 to 170–8 are closed. The switches associated with cam 170–3 and cams 170–9 to 170–12 are still open. This places the capacitance within branches 54–62 within the load circuit. The rest of the capacitance, except the fixed capacitance 50, are not in the load circuit.

Cam 170–3 differs somewhat from the other cams. This cam includes circumferentially spaced lobes so that the switch 180–1 is closed in every other stepped position of shaft 162. Since the capacitor 72 controlled by this cam has a capacitance approximately one-half the capacitance of the capacitors controlled by the other cams, the increase or decrease in capacitance progresses in half capacitance steps. As an illustration, when all cams are moved to position 2, only capacitor 72 is connected across the load circuit. This provides a capacitance of ½X, where X is considered the value of the other capacitors 74–90. In position 3, switch 180–1 is open and switch 180–2 is closed by cam 170–4. In this manner, a capacitance X is included within the load circuit. In position 4, switch 180–1 is again closed and switch 180–2 remains closed. This provides a capacitance of (1½)X. This sequence is repeated to provide steps varying from each other by an amount ½X. This function is accomplished by providing the lobes on cam 170–3 at the even numbered stepped positions. Of course, other planned incremental steps could be used.

Referring now to FIGURE 2, a substantial portion of the present invention is disclosed. Various elements in FIGURE 2 are numerically designated; however, the electrical designation is also superimposed on the drawings so that the operation may be easily appreciated primarily from viewing the drawing. In other words, various relay coils are designated CR, such as 3CR, and their respective contacts are designated CR with a following numeral, such as 3CR1. This is standard procedure in the electrical field; however, the specification will use primarily the numeral designations of the various components.

A transformer 200 is powered by input leads L1, L2 and includes an output winding 202. The output winding is connected across lines 204, 206 so that these lines are supplied with an alternating current having a predetermined voltage. Referring now to the field circuit 210, this circuit includes a line 212 extending between lines 204, 206. In line 212 there is provided a switch 214 that may be moved manually between an "off" and an "on" position, a transformer 216 and normally open contacts 218. In parallel with the normally open contacts, there are provided normally closed contacts 220. Contacts 218 or 220, when closed, energize transformer 216 which, in turn, energizes a full wave rectifier 222. In parallel across the output of the rectifier there are provided normally open contacts 224 and a branch including a rheostat 226. In series with the rectified is the field winding 228 for energizing generator G. In operation, when contacts 224 are open, current flow from the rectifier is through both the winding 228 and the rheostat 226. This provides a low current flow and substantially reduces the output of the generator G. Upon closing of the contacts 224, winding 228 is placed directly across the output of the rectifier so that high current flows through the field winding and a high output is provided by the generator.

Figure 3:
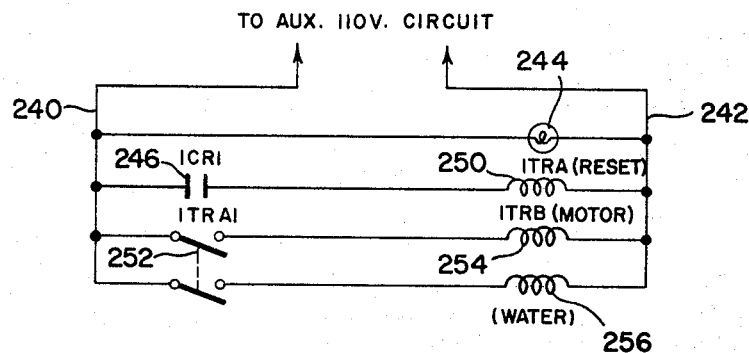
FIGURE 3 is a wiring diagram illustrating a third portion of the preferred embodiment of the present invention.

Between lines 204, 206 there are provided a plurality of separate electrical branches. Each of these branches will be hereinafter described in detail and a description of the operation of these branches will follow. Branch 230 includes an indicator light 232 and a relay coil 234. The light and relay coil are energized whenever voltage appears across lines 204, 206. Referring to FIGURE 3, which shows an auxiliary circuit including lines 240, 242 and a light 244 to indicate voltage across the lines, actuation of relay coil 234 closes normally open contacts 246. This energizes relay coil 250 which, in turn, closes a double pole switch 252. The double pole switch energizes relay coil 254 which drives the motor to the minimum capacitance, or start, position. In addition, switch 252 energizes coil 256 which actuates the coolant system for the generator or its accessory equipment. It is appreciated that the water system is not turned off as soon as the coil 256 is deactivated. There is provided, in accordance with normal practices, a time delay between de-energization of coil 256 and actual cessation of water flow through the various coolant systems.

The next branch 260 includes a manually operated "start" switch 262, a manually operated "stop" switch 264, and a relay coil 266. The relay coil actuates normally open contacts 268 which form a hold circuit around the start switch 262 and normally open contacts 270. Branch 280 includes the aforementioned normally open contacts 270 and normally closed contacts 282, 284, and 286. Also in this branch is a relay coil 288. This relay coil is adapted to close normally open contacts 218, 224 in the field circuit 210. In addition, relay coil 288 closes normally open contacts 290. In a manner to be described later, contacts 290 connect the load onto the generator; therefore, this contact has a built in time delay so that the load is disconnected from the generator after the field has been de-energized. In other words, when relay coil 288 is de-energized the contacts 218, 224 are opened and then after a predetermined time, contacts 290 are opened. The time delay should be greater than .5 second; however, in practice this time delay is between .5 second and .9 second.

Referring now to branch 300, this branch includes the contacts 290, an indicator light 302 and a relay coil 304. Light 302 indicates when the generator is being operated. The coil 304 closes normally open contacts 306, 308. Branch 310 includes normally open contacts 306 and a relay coil 312. This coil, in turn, opens previously-mentioned contacts 220 and closes switches PD1–1 in the load circuit shown in FIGURE 1. In a like manner, branch 320 includes previously-mentioned normally open contacts 308 and a relay coil 322 which opens normally closed contacts 324 and closes disconnect contacts PD2–1 in the load circuit.

Referring now to branch 330, this branch includes two separate lines 332, 334. In line 332 there is provided normally open contacts 336, 338, and 340. In line 334, there is provided a manually actuated switch 342 which may be moved between an automatic position designated A and a manual position designated as M. Switch 324 is shown in the automatic position. Extending from the switch there is a line 344 which is connected onto a terminal 346 of a control box 348, shown in dashed lines. The other terminal of the switch 342 is connected with a line 350 including an "add" or "subtract" switch 352. This switch 352 is used when the switch 342 is moved to the manual position to add or subtract capacitors manually from the load circuit of the generator. Extending beyond the switch 352 is a line 354 having a cam operated switch 356. When the switch 356 is disengaged from the lobe of cam 170–13, as shown, a relay coil 360 is in condition to be energized. In a like manner, when the switch 356 is actuated by the lobe of cam 170–13, a light 362 is lighted to indicate that a maximum amount of capacitance has been added to the load circuit. In a like manner, the switch 352 is connected onto a line 364. This line includes a cam operated switch 366 which allows actuation of a relay coil 370 when the switch is not actuated by the lobe of cam 170–1. When the switch is actuated by the lobe of this cam, as shown, a light 372 is lighted to indicate that a minimum of capacitance is inserted within the load circuit of the generator. The line 354 is connected onto a terminal 374 to receive an impulse or signal when an "add" signal is applied to box 348 by line 146. Line 364 is connected onto terminal 376 to receive an impulse or signal when a "subtract" signal is applied to box 348 by line 148. The function of the device upon the receipt of these signals will be discussed in detail later.

Relay coil 360 opens normally closed contacts 284 and closes normally open contacts 338, 380 and 382. In a like manner, relay coil 370 opens normally closed contact 286 and closes normally open contacts 340, 384, 386. Power lines 390, 392 are connected onto box 348. The box includes a transformer so that 28 volts appear across lines 142, 144, to power the KVAR meter 140, shown in FIGURE 1.

Branch 400 includes normally open contacts 402, 404 which are in parallel with the normally open contacts 380. Also in this branch there is provided a relay coil 406 which closes contacts 404, opens normally closed contacts 408, 410 and closes normally open contacts 412. In a like manner, branch 420 includes normally opened contacts 422, 424 and the previously-mentioned normally open contact 384. Also included in this branch is a relay coil 426 which closes the contacts 424, opens normally closed contacts 428, 430 and closes normally open contacts 432. As will be described later, the actuation of relay coil 360 energizes coil 406 which opens contacts 408, 410 to remove dynamic braking from motor 160 and closes contacts 412 to cause motor 160 to move in a preselected direction to add capacitance to the load circuit of the generator. The relay coil 370 operates somewhat similarly to coil 360, except the contacts 432 are closed to cause the motor 160 to rotate in an opposite direction. This subtracts capacitance from the load circuit of the generator.

The motor 160 is provided with a dynamic braking circuit including lines 440, 442. In these lines there are included normally closed contacts 408, 428 and 410, 430, respectively. To provide a direct current through the motor, diodes 444, 446 are provided within the lines 440, 442. The electrical connection for the dynamic braking is completed by a line 448 connected onto line 206.

A motor control branch 450 includes the previously-mentioned normally closed contacts 324 and the previously-mentioned normally open contacts 412, 432. When the contacts 412 are closed, the motor rotates in a first direction. Conversely, when the contacts 432 are closed the motor rotates in a second direction. This difference in the direction of rotation causes the various cams driven as a unit by the motor to move in an "add" capacitance or "subtract" capacitance direction. A capacitor 452 is provided across the input lines to motor 160. This capacitor forms a part of the dynamic braking circuit as previously described.

The last branch in the device disclosed in the drawings is branch 460 which includes two cam operated switches 462, 464. These two switches are actuated by a multiple-lobed cam 170–2. The lobes on these cams move the switches upwardly when the motor 160 is in a preselected stepped position. In other words, at each stepped interval one of the switches 462, 464 is closed. Two switches are provided so that cam 170–2 may be a double cam having a double switch arrangement. The lobes of one cam move one of the switches upwardly just before the motor shaft is in a stepped position when moving in an "add" direction, and the lobes of the other cam move the other switch upwardly just before the motor shaft is in a stepped position when moving in a "subtract" direction. In this manner, one of the switches 462, 464 is moved upwardly as the cams move into a stepped position, irrespective of the direction of rotation of the motor.

Branch 460 also includes previously-mentioned normally open contacts 382 and normally closed contacts 466. A relay coil 468 operates normally open contacts 470 forming a hold circuit around switches 462, 464 and the previously-mentioned normally open contacts 336. When either switch 462, 464 is in the upward position, a relay coil 472 is energized. This opens normally closed contacts 466, opens normally closed contacts 282 and closes normally open contacts 402, 422. This concludes the discussion of the mechanism comprising the preferred embodiment of the present invention.

In operation, assuming that the various switches are in the conditions indicated in the drawings, and the induction heating coil 40 is ready to heat workpiece 42, circuit breakers 10 are closed. This does not energize the various meters shown in FIGURE 1 because no current is flowing in field winding 228. Thereafter, lines L1–L2 of FIGURE 2 are energized. This creates a voltage across lines 204, 206 so that coil 234 is energized. Referring to FIGURE 3, this closes contacts 246 which energizes coil 250 and closes double pole switch 252. In this manner, coil 254 resets the motor to the minimum capacitance position, if it is not in this position. The cams 170–1 to 170–13 are shown in position number 1; therefore, the motor is in the minimum capacitance condition and light 372 is energized by switch 366 in response to cam 170–1. Switch 252 also actuates coil 256 which causes water to flow in the various coolant systems. Since switch 214 is in the "off" position, the field 228 is not energized and no power is being directed from the generator G to the heating coil 40.

Switch 214 is then moved to the "on" position. This causes a slight amount of current to flow in the field winding 228. This allows the generator to power the various meters; however, the amount of current flow through the winding 228 is very low and little power is developed across the output lines of the generator. The "start" switch 262 is depressed which actuates relay coil 266. This closes contacts 268, 270. The closing of contacts 270 energizes relay coil 288 which closes contacts 218, 224, and 290. In this manner high current flows through the field winding 228 so that high power is created by the generator within the load circuit. The switch or contacts 290, when closed, allow actuation of coil 304. This closes contacts 306, 308 so that the circuit breakers PD1–1 and PD2–1 are closed to connect the load circuit to the output of the generator. The system is now in operation and the capacitance in the output circuit may be less than that required to bring the power factor to unity, or at least within the range set by limit markers 154, 156 of meter 140.

The needed capacitance could be included by setting switch 342 to the manual position M and moving the switch 352 to the "add" position. This would cause an addition of capacitance branches in the output circuit in a manner which will be apparent during the description of the automatic control which forms a substantial part of the present invention.

Assuming now that the switch 342 is moved downwardly into the automatic position A. This supplies power to terminal 346. The meter 140 will supply an "add" signal through line 146 to box 348. This "add" signal causes a signal in line 354. Since switch 356 is in the up position, indicating that less than maximum capacitance has been included within the output circuit, the "add" signal energizes coil 360. This opens contacts 284 in branch 280. Consequently, coil 288 is de-energized. This first de-energizes field winding 228 by opening contacts 218 and then opens contacts of switch 290. This in turn opens the switches PD1–1 and PD2–1 as shown in FIGURE 1, in a manner previously described. The coil 312, when deactivated, allows contacts 220 to close. This then creates a limited amount of flow through the winding 228 so that the metering function of the circuit shown in FIGURE 1 can continue without full generator output. The system is now ready to add capacitance. This takes place by first closing contact 338, which at this time has no result except to condition the hold circuit including contacts 336. Thereafter, the coil 360 closes contacts 380. This energizes coil 406 to open contacts 408, 410. This removes the dynamic braking circuit from motor 160. At the same time, coil 406 closes contacts 412 which causes motor 160 to be energized in the "add" direction. Consequently, the cams are moving from the number 1 position toward the number 2 position. Coil 360 also closes contacts 382. This actuates coil 468, which can be termed a memory coil since it maintains the motor energized between each step of movement in the power factor correcting function. When coil 468 is energized, contacts 470 are closed. This creates a holding circuit around switches 462, 464. In addition, contacts 336 are energized which by-pass the box 348 in holding coil 360 in the energized condition. As long as contacts 336 are held closed by coil 468, the motor will rotate in the add capacitance direction.

When the motor approaches position number 2, cam 170–3 closes switch 180–1. This closes switch 92 and connects capacitor 72 across the load circuit of the generator. At the same time, cam 170–2 moves one of the switches 462, 464 into the up position. This energizes coil 472 at the next stepped position of the cam i.e. position number 2. Coil 472 opens contacts 466 and closes contacts 402, 422. This first de-energizes coil 468 so that contacts 336 are opened. This will de-energize relay coil 360, if the power factor of the output circuit is sufficient to preclude any "add" signal. Assuming that the first capacitance is sufficient to bring the power factor into the desired range, contacts 380 are opened. This does not de-energize coil 406 to stop the motor until the cam 170–2 is rotated into the exact stepped position. At that precise time, the switch 462 or 464 which had been raised is dropped into its lower position. This de-energizes coil 472 and opens contacts 402, 422. The latter contacts of course are used only when the subtract function is being performed. With contacts 402 being opened, and in view of the fact that there is no "add" signal to cause contacts 380 to be opened, the coil 406 is de-energized. This closes contacts 408, 410 and opens contacts 412. This stops the motor at precisely the number 2 position. If there is no "add" signal received by coil 360, the contacts 284 are again allowed to close. This energizes relay coil 288 and, in turn, coils 304, 312, 322. This connects the output of generator G with the load circuit.

In the above description it was assumed that rotation of the motor to the number 2 position is sufficient to add the proper capacitance to the output circuit of the generator. If this is not done, the coil 360 remains energized by an "add" signal through line 146, irrespective of the intermittent opening of contact 336. Consequently, the motor continues to rotate from step to step until the opening of one of the switches 462, 464 by the cam 170–2 causes the contacts 336 to open while an "add" signal is not present. If the capacitance is adjusted to the maximum position, i.e. position 20 of the cams, the cam 170–13 moves switches 356 into the down position. This illuminates light 362 and indicates that a maximum capacitance is in the circuit. If this happens during normal operation, there is a possibility that the minimum fixed capacitance of capacitor 50 should be increased.

Assuming now that the load characteristics change so that less capacitance is required. A "subtract" signal is received through line 148 from meter 140. The switch 366 is in the up position because the cam 170-1 is no longer in the number 1 position. Consequently, the signal from line 148 passes through terminal 176 and energizes coil 370. This first opens contacts 286. In a manner previously described, coil 288 is de-energized to reduce the current flow through the field winding and disconnect the load circuit from the generator. Coil 370 then closes contacts 340 and 384. In this manner, the holding circuit for coil 370 including contacts 336 is conditioned for operation by coil 468. Also, coil 426 is energized. Coil 426 opens contacts 428, 430 so that the dynamic braking effect is removed from the motor 160. Coil 426 also closes contacts 432 to cause rotation of motor 160 in a direction opposite to the add capacitance direction. One of the switches 462, 464 is then moved upwardly by cam 170-2 to stop the motor 160 after the proper amount of capacitance has been removed from the circuit.

It is appreciated that the present invention has been described in connection with one structural embodiment; however, various changes may be made in this embodiment without departing from the intended spirit and scope of the present invention.

Having thus described our invention, we claim:

1. A device for maintaining within a preselected range the power factor in the load connected output circuit of a generator while the electrical characteristics of the load vary, said device comprising: a bank of separate capacitor branches each including a capacitor and a switch means for selectively connecting said capacitor into said output circuit; a reversible motor means; means responsive to rotation of said motor means for sequentially and in stepped fashion operating each of said switch means to increase the number of said branches electrically connected in said output circuit when said motor means rotates in a first direction and to decrease the number of said branches electrically connected in said output circuit when said motor means rotates in a second direction; a power factor meter means in said output circuit to sense a deviation of the power factor in said output circuit from said preselected range; means for rotating said motor means in response to the sensed deviation of said actual power factor to correct said power factor with said motor rotating in said first direction when said sensed deviation is on one side of said range and in said second direction when said sensed deviation is on the other side of said range; means for braking said motor against rotation; and means for actuating said braking means when said meter means senses a power factor within said preselected range.

2. A device as defined in claim 1 wherein said braking means includes a dynamic braking circuit and said actuating means includes a control switch in said braking circuit which control switch is closed when said power factor is within said preselected range.

3. A device as defined in claim 1 wherein said motor responsive means includes a plurality of cams on a rotary shaft driven by said motor means; each of said cams being operably associated with one of said switch means, said cams having lobes with the lobes closing said switch means and holding said switch means closed as said motor rotates in said first direction; and said lobes being positioned with respect to the circumference of said shaft to close said switch means in sequence.

4. A device as defined in claim 3 including a first limit switch and a second limit switch; said first limit switch being actuated in response to maximum capacitor branches in said output circuit and said second limit switch being actuated in response to minimum capacitor branches in said output circuit; means responsive to actuation of said first limit switch to prevent movement of said motor means in said first direction; and means responsive to actuation of said second limit switch to prevent movement of said motor means in said second direction.

5. A device as defined in claim 4 wherein said first limit switch is actuated by a maximum capacitor cam on said shaft and said second limit switch is actuated by a minimum capacitor cam on said shaft; said maximum capacitor cam having a lobe arranged with respect to said shaft to actuate said first limit switch when said motor means has rotated to its limit in said first direction; and, said minimum cam having a lobe arranged with respect to said shaft to actuate said second limit switch when said motor means has rotated to its limit in said second direction.

6. A device as defined in claim 1 wherein said motor rotating means includes a circuit for stepping said motor means in a selected one of said directions; said stepping circuit including a first relay coil energized when said meter means indicates a deviation on said one side of said range, a second relay coil energized when said meter means indicates a deviation on said other side of said range, actuation of said first coil causing rotation of said motor means in said first direction, and actuation of said second coil causing rotation of said motor means in said second direction.

7. A device as defined in claim 6 including circuit means for maintaining said coils energized until said motor rotates into a successive stepped position.

8. A device as defined in claim 7 wherein said maintaining circuit means includes a third relay coil with contacts for holding one of said first or second coils energized until said motor rotates into a successive stepped position, and means for energizing said third coil at all times when said motor means movement is between set stepped positions.

9. A device as defined in claim 8 wherein third coil energizing means includes a control switch and means for opening said switch only when said motor means is rotated into a stepped position irrespective of the sensed power factor.

10. A device as defined in claim 1 including means for disconnecting said load from said output circuit before said motor means is rotated and means for connecting said load to said output circuit after said motor means is rotated to the proper position.

11. A device as defined in claim 1 including a field winding for said generator and means for disconnecting said field winding before said motor means is rotated and means for connecting said field winding after said motor means is rotated to the proper position.

12. A device as defined in claim 11 including means for disconnecting said load from said output circuit after said winding is disconnected and before said motor means is rotated and means for connecting said load to said output circuit after said motor means is rotated to the proper position.

13. A device as defined in claim 12 wherein the delay between disconnecting said field winding and disconnecting said load is at least approximately 0.5 second.

14. A device as defined in claim 1 including an auxiliary capacitor branch having a capacitance substantially less than the capacitance of said mentioned branches, and means for inserting said auxiliary branch into said output circuit between each sequential operation of said switch means of said mentioned branches.

15. A device as defined in claim 14 wherein the capacitance of said auxiliary branch is approximately one half the capacitance of said mentioned branches.

16. A device for maintaining within a preselected range the power factor in the load connected output circuit of a generator while the electrical characteristics of the load vary, said device comprising: a bank of separate capacitor branches each including a capacitor and a switch means for selectively connecting said capacitor into said output circuit; a reversible motor having an output shaft; means driven by said shaft for sequentially and in stepped fashion closing said switch means when said shaft is rotated in a first direction and for sequentially and in stepped fashion opening said switch means when said shaft is rotated in a second direction whereby the motor moves between distinct stepped positions; monitoring means in said output circuit to generate an add signal when the power factor of said output circuit deviates in one direction from said range; monitoring means in said output circuit to generate a subtract signal when the power factor of said output circuit deviates in the other direction from said range; a first relay coil for energizing said motor in said first direction; means for energizing said first coil by said add signal; a second relay coil for energizing said motor in said second direction; means for energizing said second coil by said subtract signal; means for maintaining said first or second coils in an energized condition until said motor has rotated into a given stepped position; and means for de-energizing said maintaining means at each stepped position whereby said first and second coils are both de-energizable by an absence of a signal.

17. A device as defined in claim 16 wherein said maintaining means includes a third relay coil with contacts which are actuated to maintain said first and second coils energized and means for energizing said third coil while said driven means is between said stepped position and means for de-energizing said third coil while said driven means is in one of said stepped positions.

18. A device as defined in claim 16 wherein said motor includes a dynamic braking circuit and means for energizing said braking circuit when both said first and said second coils are de-energized.

19. A device for maintaining within a preselected range the power factor in the load connected output circuit of a generator while the electrical characteristics of the load vary, said device comprising: a bank of separate capacitor branches each including a capacitor and a switch means for selectively connecting said capacitor into said output circuit; a reversible motor; a bank of cams rotated in unison by said motor with the cam rotating in a first direction when said motor rotates in one direction and in a second direction when said motor rotates in the other direction; one of said cams closing each of said switch means when said cams are in a given selected, stepped position with said cam opening and closing said switch means in sequence according to the direction of rotation of said cam bank; first means for energizing said motor in said one direction when the power factor of said circuit requires more capacitance to bring it into said range; second means for energizing said motor in the other direction when the power factor of said circuit requires less capacitance to bring it into said range; and a cam in said bank for maintaining said motor energized between stepped positions, irrespective of the power factor in said output circuit.

20. A device as defined in claim 19 including a cam for de-energizing said motor at a stepped position only if the power factor of said output circuit is within said range at said stepped position.

21. A device as defined in claim 20 wherein said motor maintaining and said motor de-energizing cam is a single cam operating a double throw switch with a first position effective to maintain said motor energized and a second position effective to de-energize said motor if said power factor is within said range.

22. A device as defined in claim 19 including a braking circuit for said motor and means responsive to de-energization of said motor for actuating said braking circuit.

(References on following page)

References Cited

UNITED STATES PATENTS

| | | | |
|---|---|---|---|
| 2,676,235 | 4/1954 | Kennedy et al. | 219—10.75 X |
| 2,918,588 | 12/1959 | Rittenhouse et al. | 323—128 X |
| 3,185,811 | 5/1965 | Kasper et al. | 322—20 X |

ORIS L. RADER, *Primary Examiner.*

HAROLD HUBERFELD, *Assistant Examiner.*

U.S. Cl. X.R.

219—10.77; 307—87; 322—20; 323—128